(12) United States Patent
DelGais (10) Patent No.: US 7,862,644 B2
(45) Date of Patent: Jan. 4, 2011

(54) DRY SCRUBBER AND METHOD OF CONVERTING A WET SCRUBBER TO A DRY SCRUBBER

(75) Inventor: Michael DelGais, Woodstock, GA (US)

(73) Assignee: Purafil, Inc., Doraville, GA (US)

( * ) Notice: Subject to any disclaimer, the term of this patent is extended or adjusted under 35 U.S.C. 154(b) by 766 days.

(21) Appl. No.: 11/767,260

(22) Filed: Jun. 22, 2007

(65) Prior Publication Data

US 2008/0317644 A1    Dec. 25, 2008

(51) Int. Cl.
*B01D 53/02*    (2006.01)
*B01D 53/14*    (2006.01)

(52) U.S. Cl. ............................................. 95/92; 96/131

(58) Field of Classification Search ............ 95/90, 95/92, 132, 149, 210, 233; 96/108, 121, 96/131, 234, 290; 423/210, 240 R, 240 S; 422/177, 211

See application file for complete search history.

(56) References Cited

U.S. PATENT DOCUMENTS

| | | | | |
|---|---|---|---|---|
| 3,556,734 A | * | 1/1971 | Peterson | 422/171 |
| 3,928,532 A | * | 12/1975 | Squires | 423/210 |
| 3,969,482 A | * | 7/1976 | Teller | 423/235 |
| 4,698,072 A | * | 10/1987 | Rohde et al. | 95/119 |
| 5,538,543 A | * | 7/1996 | Watanabe et al. | 96/131 |
| 6,086,659 A | * | 7/2000 | Tentarelli | 96/131 |
| 6,174,498 B1 | * | 1/2001 | Jain et al. | 422/122 |
| 6,572,687 B2 | * | 6/2003 | Slaymaker | 96/119 |
| 6,592,652 B2 | * | 7/2003 | Tremblay | 95/90 |

* cited by examiner

*Primary Examiner*—Frank M Lawrence
(74) *Attorney, Agent, or Firm*—Kilpatrick Stockton LLP (57) ABSTRACT

A scrubber that employs a dry chemical medium includes a first vessel defining a first cavity. A second vessel adjoining the first vessel defines a second cavity, and the first and second cavities combine to form a common chamber. A fan draws a gaseous stream into the chamber at a first location and extracts the gaseous stream from the chamber at a second location. A plurality of partitions extend substantially from the upper end of the chamber to the floor. A dry chemical medium is disposed within the spaces between the partitions for neutralizing a pollutant in a gaseous stream. The partitions have openings of a sufficiently large size to permit gas to flow therethrough but of a sufficiently small size to prevent the dry chemical medium from passing therethrough. A method for converting a wet scrubber to a dry scrubber of the type described is also disclosed.

8 Claims, 7 Drawing Sheets

DRY SCRUBBER AND METHOD OF CONVERTING A WET SCRUBBER TO A DRY SCRUBBER

TECHNICAL FIELD

The present invention relates generally to scrubbers for cleaning contaminants from a gaseous flow. More specifically the invention relates to a dry scrubber and to a method for converting a wet scrubber to a dry scrubber.

BACKGROUND OF THE INVENTION

Wet scrubbers are a simple and commonly used approach to removing contaminants from gas streams. The principle of a wet scrubber is to remove contaminants from the gas stream by passing the stream through a reaction chamber, which is a packed structure that provides a large wetted surface area to induce intimate contact between the gas and the scrubbing liquid. The contaminant is absorbed into or reacted with the scrubbing liquid.

Wet scrubbers can be divided into two basic categories: vertical and horizontal airflow models. In one common type of vertical wet scrubber, a reaction chamber contains layers of variously-shaped packing material, such as Rashig rings, spiral rings, or Berl saddles, that provide a large surface area for liquid-particle contact. The packing is held in place by open mesh retainers and supported by a plate near the bottom of the scrubber. Scrubbing liquid is evenly introduced above the packing and flows down through the bed. Liquid coats the packing and establishes a thin film. The pollutant to be absorbed is soluble in the fluid. In vertical designs, the gas stream flows up the chamber (countercurrent to the liquid).

A horizontal wet scrubber works on essentially the same principles. A scrubber vessel defines a reaction chamber. Dividers within the reaction chamber define a serpentine path from the inlet to the outlet. This serpentine path increases the residence time of a gaseous stream in the reaction chamber. The reaction chamber is typically filled with a packing material. The packing material is normally a proprietary, loose fill, random packing designed to encourage dispersion of the liquid flow without tracking, to provide maximum contact area for a "mass transfer" interaction, and to offer minimal back pressure to the gas flow. The reaction chamber has chemical spray nozzles that distribute the caustic solution over the tower packing media. The scrubber vessel is located on the top of a fluid storage tank, which is an integral part of the system. A screen separates the reaction chamber from the fluid storage tank and supports the packing material, while permitting the caustic solution to drain into the storage tank. A recirculation pump drains the caustic solution, e.g. sodium hydroxide (NaOH), from the bottom of the fluid storage tank and circulates it through the reaction chamber. A fan draws contaminated gas through the system such that the gas stream flows crosscurrent to the liquid. The gas stream passes through the reaction chamber, is absorbed by reacting with the caustic solution, and is exhausted through a stack. A demister is fitted at the top of the tower to prevent entrainment of droplets of the scrubbing liquor into the extraction system or stack.

One use for a wet scrubber is to remove chlorine gas that might leak from a storage cylinder. Facilities storing hazardous quantities of chlorine or sulfur dioxide must invest in emergency standby equipment to prevent accidental chemical releases. The Environmental Protection Agency's (EPA's) Risk Management Program for Chemical Accident Release Prevention "requires regulated facilities to develop and implement appropriate risk management programs to minimize the frequency and severity of chemical plant accidents." In addition, "a performance-based approach towards compliance with the risk management program rule is required."

The Uniform Fire Code, Article 80, states that the full contents of the single largest storage container of chlorine must be mitigated in thirty minutes. If a toxic gas release were to occur from a one-ton cylinder of chlorine, the laws of thermodynamics suggest that approximately 400 lbs of liquid chlorine would flash into vapor, and the remaining contents of the chlorine cylinder would spill out as a liquid at its boiling point.

Chlorine cylinders are stored in a separately enclosed storage room, which is equipped with a chlorine detector. During normal automatic system operation, when a chlorine leak or spill occurs, the chlorine detector activates the system in two steps. The pump is activated first to permit proper and complete wetting of the packing material with the caustic solution. Next, the exhaust fan is activated. The exhaust fan is placed downstream of the scrubber. This placement of the fan allows the complete system, including the storage room ducting and scrubber, to remain under negative pressure until all chlorine is removed. Thus any leaks draw air into the system, rather than leaking out contaminated gas. An adjustable time delay is provided to delay the start of the exhaust fan and subsequent movement of the air through the scrubber. This feature allows all of the chlorine laden air to fully react and substantially eliminates the possibility of any chlorine gas passing through the scrubber and into the atmosphere.

Wet scrubbers suffer a number of disadvantages. The NaOH used in the scrubber is highly caustic. Thus proper construction materials and methods are very important to prevent leaks from the tank. A recirculation pump and associated plumbing are required to constantly pump the scrubbing fluid from the tank and to spray it over the packing material in the scrubbing vessel. The pump requires energy to operate, and the distribution pipes present another source of possible corrosion and leaks.

For these and other reasons, a dry scrubber is often a preferred solution. Dry scrubbers pass the gaseous stream through a granular solid catalyst. The pollutants in the gaseous stream react with the catalyst and are neutralized. No corrosive liquids are employed, and hence the danger of a leak is eliminated. In addition, no recirculation pump is required, eliminating a source of energy usage and possible mechanical problems.

It would therefore be advantageous in many applications to convert an existing wet scrubber to a dry scrubber, preferably in a way that maximizes re-use of existing components. This is not a straightforward modification, however. The granular dry catalyst is much more dense that a corresponding volume of wet packing material. Thus if one were simply to remove the packing material and replace it with a corresponding volume of dry catalyst, the pressure drop through the serpentine path would make it impossible to meet regulation requirements. In the example given above of chlorine cylinders stored in a separately enclosed storage room, there are requirements that the airflow be extracted from the storage room at a rate of no less than 2,238 $ft^3$/min. (the rate at which chlorine gas escapes from a ruptured cylinder). On the other hand, if the dividers are removed so as to reduce the pressure drop, then the residence time of the gaseous stream within the reaction chamber is not sufficient to neutralize the contaminants. Thus simply substituting a dry catalyst for the packing material of a wet scrubber will not produce satisfactory results.

Thus there is a need for a method for converting a wet scrubber to a dry scrubber.

There is a further need for a method for converting a wet scrubber to a dry scrubber in a manner that maximizes the re-use of existing equipment.

SUMMARY OF THE INVENTION

Stated generally, in a first aspect the present invention comprises a scrubber that employs a dry chemical medium. A first vessel defines a first cavity. A second vessel adjoining the first vessel defines a second cavity, and the first and second cavities combine to form a common chamber. A fan draws a gaseous stream into the chamber at a first location and extracts the gaseous stream from the chamber at a second location. A plurality of partitions extend substantially from the upper end of the chamber to the floor. A dry chemical medium is disposed within the spaces between the partitions for neutralizing a pollutant in a gaseous stream. The partitions have openings of a sufficiently large size to permit gas to flow therethrough but of a sufficiently small size to prevent the dry chemical medium from passing therethrough.

In a second aspect, the invention provides a method for converting a wet scrubber to a dry scrubber. Prior to modifications the wet scrubber comprises a tank and a scrubber vessel situated on top of the tank. A screen divides the tank from the reaction chamber defined by the scrubber vessel. A fan draws a gaseous stream into the reaction chamber at a first location and extracts the gaseous stream from the reaction chamber at a second location. Dividers within the reaction chamber define a circuitous path between the first and second locations to increase the residence time of the gas stream within the reaction chamber. Packing material is provided within the reaction chamber. A pump circulates NaOH or other caustic material from the tank and sprays it onto the packing material. The gaseous stream thus contacts droplets of the caustic material as it passes through the reaction chamber, neutralizing pollutants in the gas stream.

To convert the wet scrubber to a dry scrubber, the caustic solution is drained from the tank. The pump and associated plumbing that circulated the caustic solution from the tank and sprayed it over the packing material is removed. The packing material and dividers within the reaction chamber are removed. The screen that divides the tank from the reaction chamber is removed such that the tank and the scrubber vessel define a common chamber.

Next a plurality of dividers are positioned within the common chamber, with the lower ends of the dividers resting on the floor of the tank, and the upper ends of the dividers extending substantially to the upper end of the common chamber. A dry chemical media is introduced into the spaces between the dividers. In one embodiment the dry chemical media has a removal capacity of approximately 15% by weight.

In the disclosed embodiment, modifications to the fan motor are made to compensate for the increase in volume of the gas stream resulting from the temperature increase caused by the chemical reaction within the common chamber.

Thus it is an object of the present invention to provide a method for converting a wet scrubber to a dry scrubber.

It is another object of the present invention to provide a method for converting a wet scrubber to a dry scrubber that reuses many of the original wet scrubber components.

Other objects, features, and advantages of the present invention will become apparent upon reading the following specification, when taken in conjunction with the drawings and the appended claims.

DETAILED DESCRIPTION OF THE DISCLOSED EMBODIMENT

Figure 1:
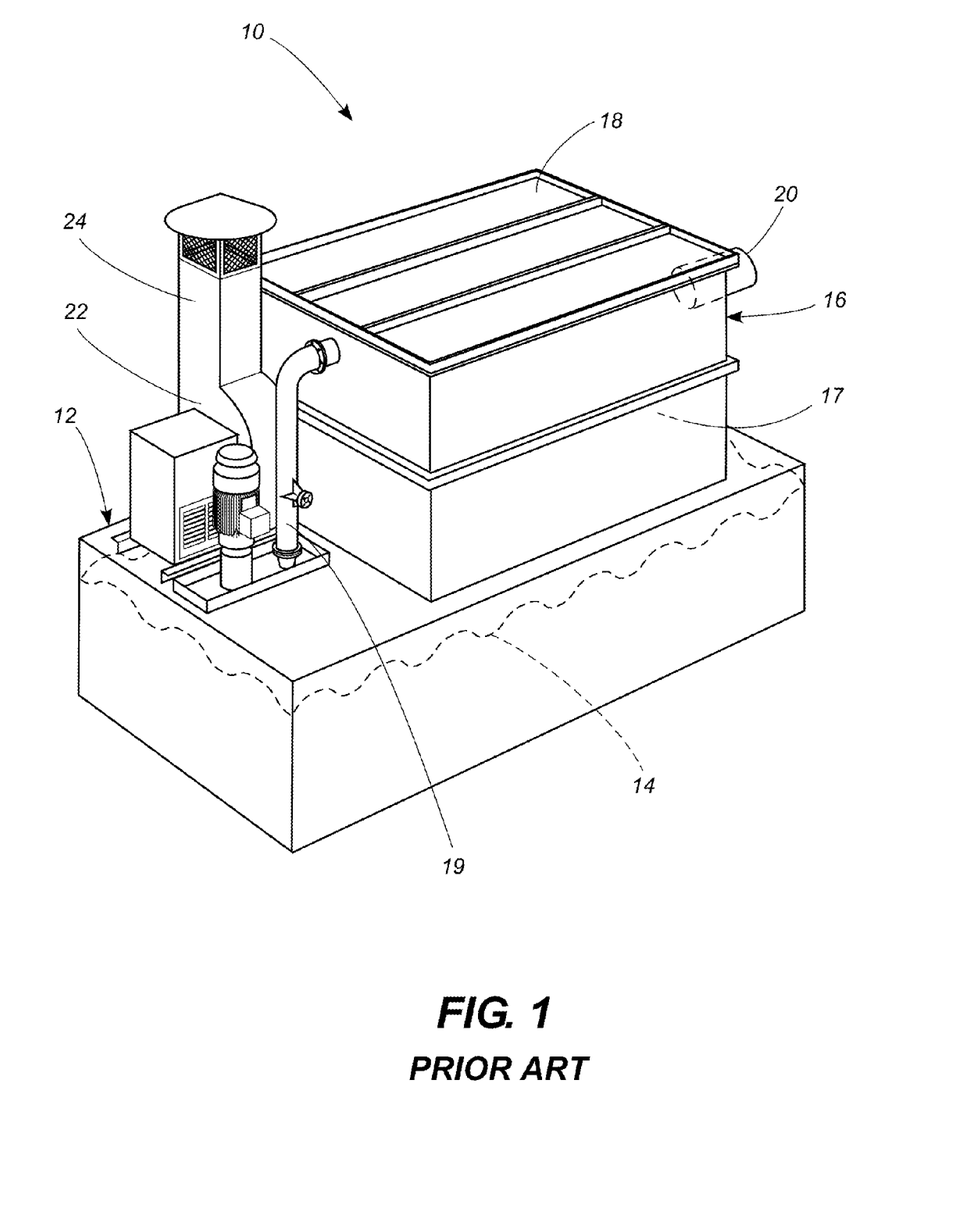
FIG. 1 is a perspective view of a PRIOR ART wet scrubber.

Referring now to the drawings, in which like numerals indicate like elements throughout the several views, FIG. 1 shows a PRIOR ART wet scrubber 10 comprising a tank 12. The tank 12 is substantially filled with a scrubbing liquid 14. Atop the tank 12 is a scrubbing vessel 16 that defines a reaction chamber 17 therewithin. The scrubbing vessel 16 has a top 18. A pump (not shown) circulates the scrubbing liquid 14 through a pipe 19 and into the upper portion of the scrubbing vessel 16. Within the scrubbing vessel 16 the pipe 19 branches and sprays the scrubbing liquid 14 throughout the reaction chamber 17.

An inlet 20 for a gaseous stream is located on one end of the scrubbing vessel 16. Diagonally opposite the inlet 20 at the other end of the scrubbing vessel 16 is a fan 22 that draws air into the inlet 20, through the reaction chamber 17, and out through a stack 24 above the fan.

Figure 2:
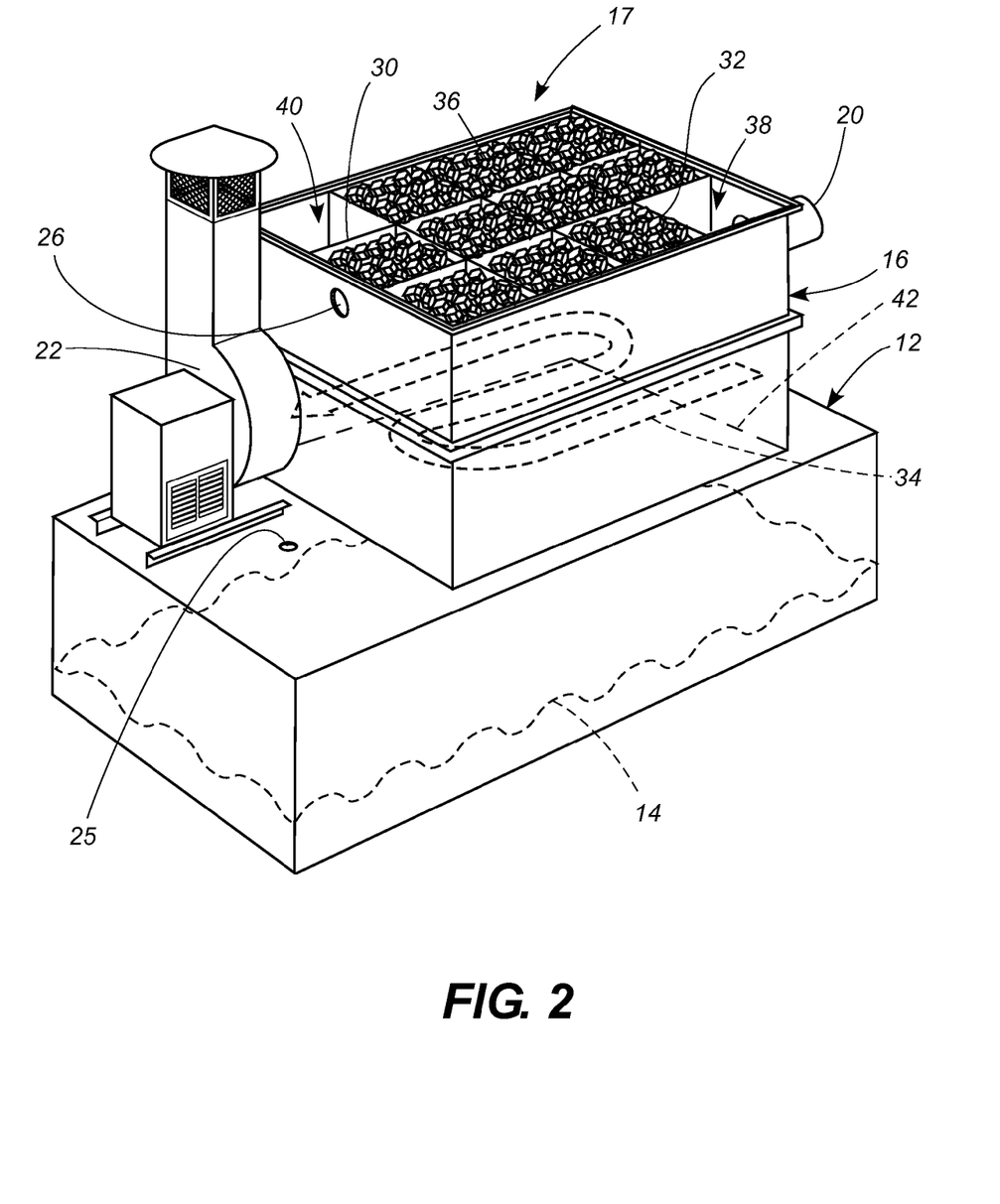
FIG. 2 is a perspective view showing a first step in converting the wet scrubber of FIG. 1 into a dry scrubber.

FIG. 2 shows the top 18 (FIG. 1) of the scrubbing vessel 16 removed to show interior detail. As a first step in modifying the scrubber, the pump and associated plumbing, e.g. pipe 19 (FIG. 1), that circulates the scrubbing liquid 14 has been removed, leaving holes 25, 26 in the tank 12 and scrubbing vessel 16 respectively. In addition, the scrubbing liquid 14 in the tank 12 is being drained.

With further reference to FIG. 2, a plurality of solid dividers 30 and screens 32 transverse to the dividers 30 are located within the reaction chamber 17. The dividers 30 and screens 32 direct the gaseous flow from the inlet 20 to the fan 22 in a circuitous path, indicated by the arrow 34. The dividers 30 and screens 32 divide the reaction chamber into a series of cells, most of which are filled with packing material 36, such as Rashig rings, spiral rings, or Berl saddles. The cells 38, 40 adjacent the inlet 20 and fan 22 respectively, are left vacant to form plenums to help distribute the gaseous airflow more evenly across the flow path.

Also shown in FIG. 2 is a grate 42 that divides the reaction chamber of the scrubber vessel 16 from the tank 12 and provides a floor to support the packing material 36.

Figure 3:
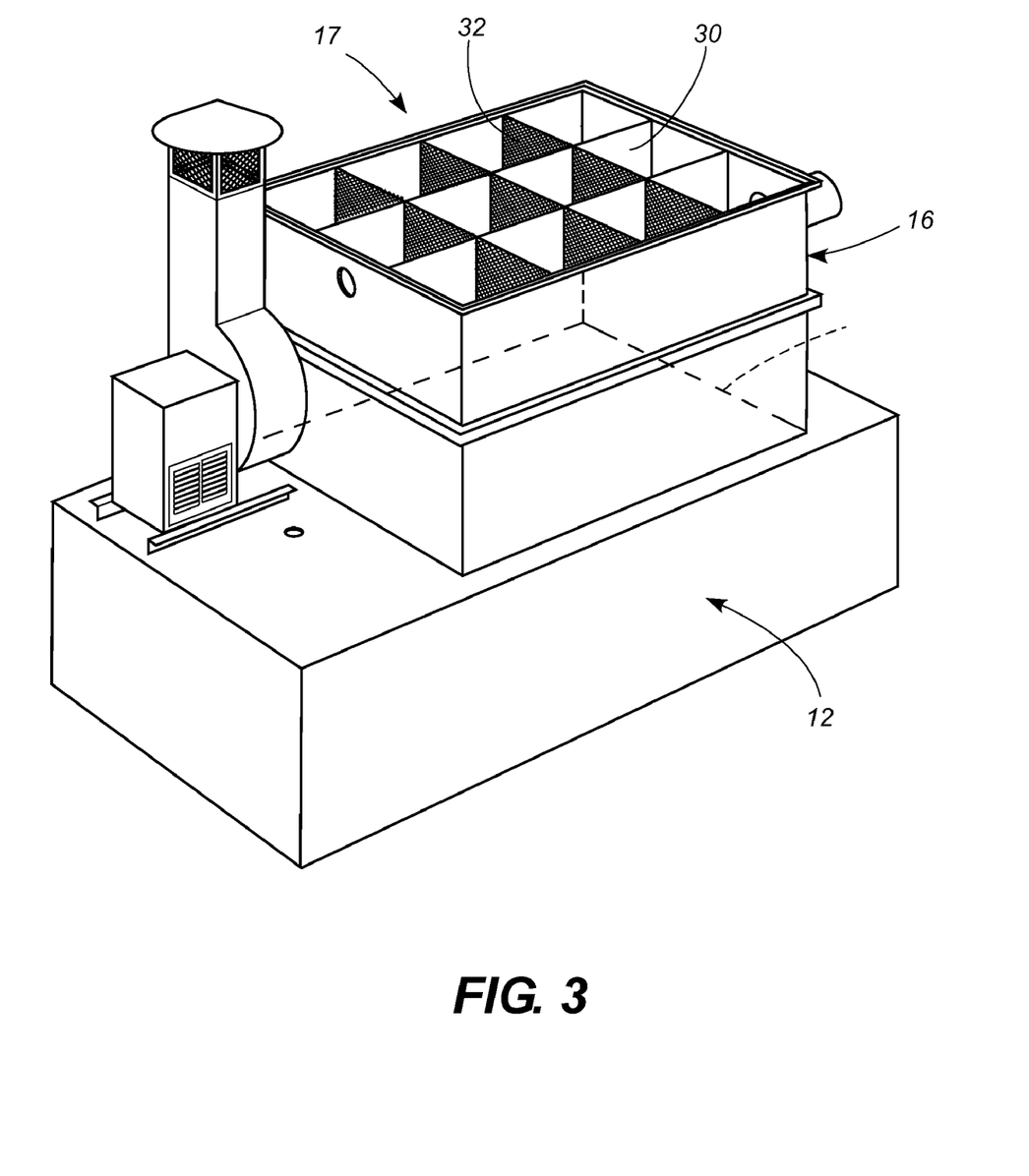
FIG. 3 is a perspective view showing a second step in converting the wet scrubber of FIG. 1 into a dry scrubber.

FIG. 3 shows further modifications to the scrubber, including removal of the packing material 36 (FIG. 2). The scrubbing liquid 14 (FIGS. 1 and 2) has now been completely drained from the tank 12.

Figure 4:
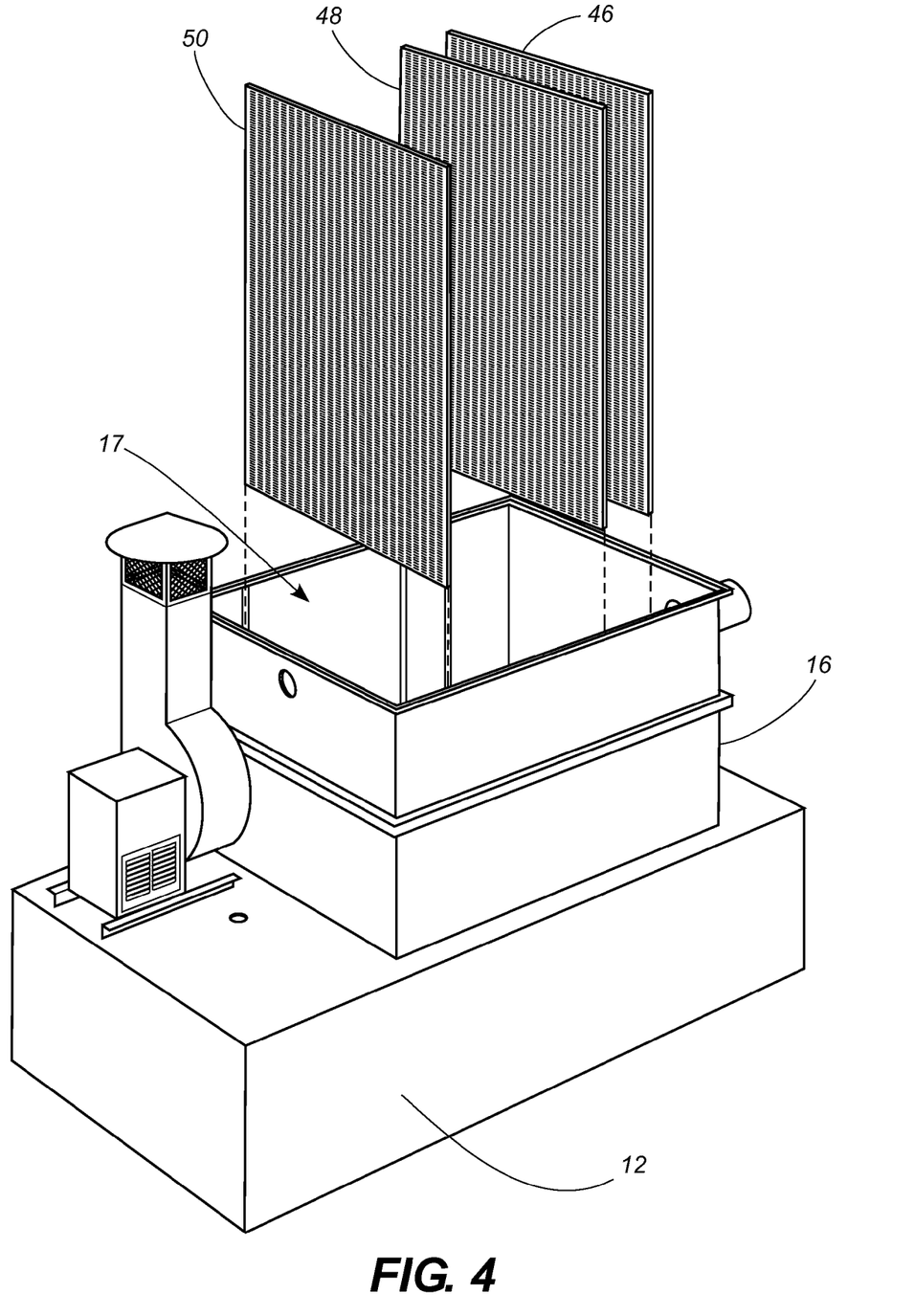
FIG. 4 is a perspective view showing a third step in converting the wet scrubber of FIG. 1 into a dry scrubber.

In FIG. 4, the dividers 30 and screens 32 (FIG. 3) have been removed, as has the grate 42 (FIG. 3) that divides the reaction chamber 17 of the scrubber vessel 16 from the tank 12. A set of three replacement screens 46, 48, 50 that extend the full width of the reaction chamber 17 are shown exploded above the scrubber vessel 16.

Figure 5:
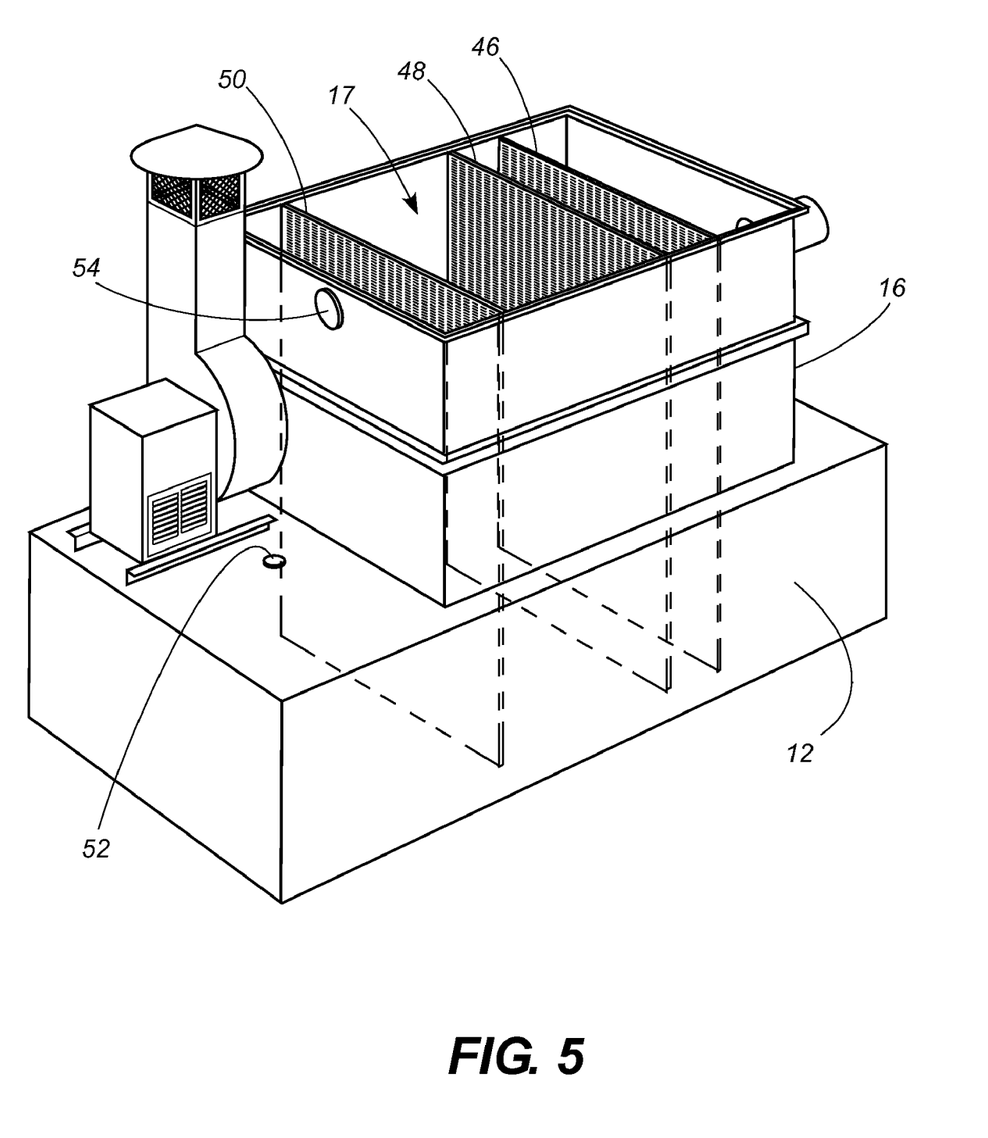
FIG. 5 is a perspective view showing a fourth step in converting the wet scrubber of FIG. 1 into a dry scrubber.

FIG. 5 shows the screens 46, 48, 50 in place within the reaction chamber 17. The bottoms of the screens 46, 48, 50 rest on the floor of the tank 12. Also, covers 52, 54 have been placed over the holes 25, 26 (FIG. 2) in the tank 12 and scrubbing vessel 16 respectively.

Figure 6:
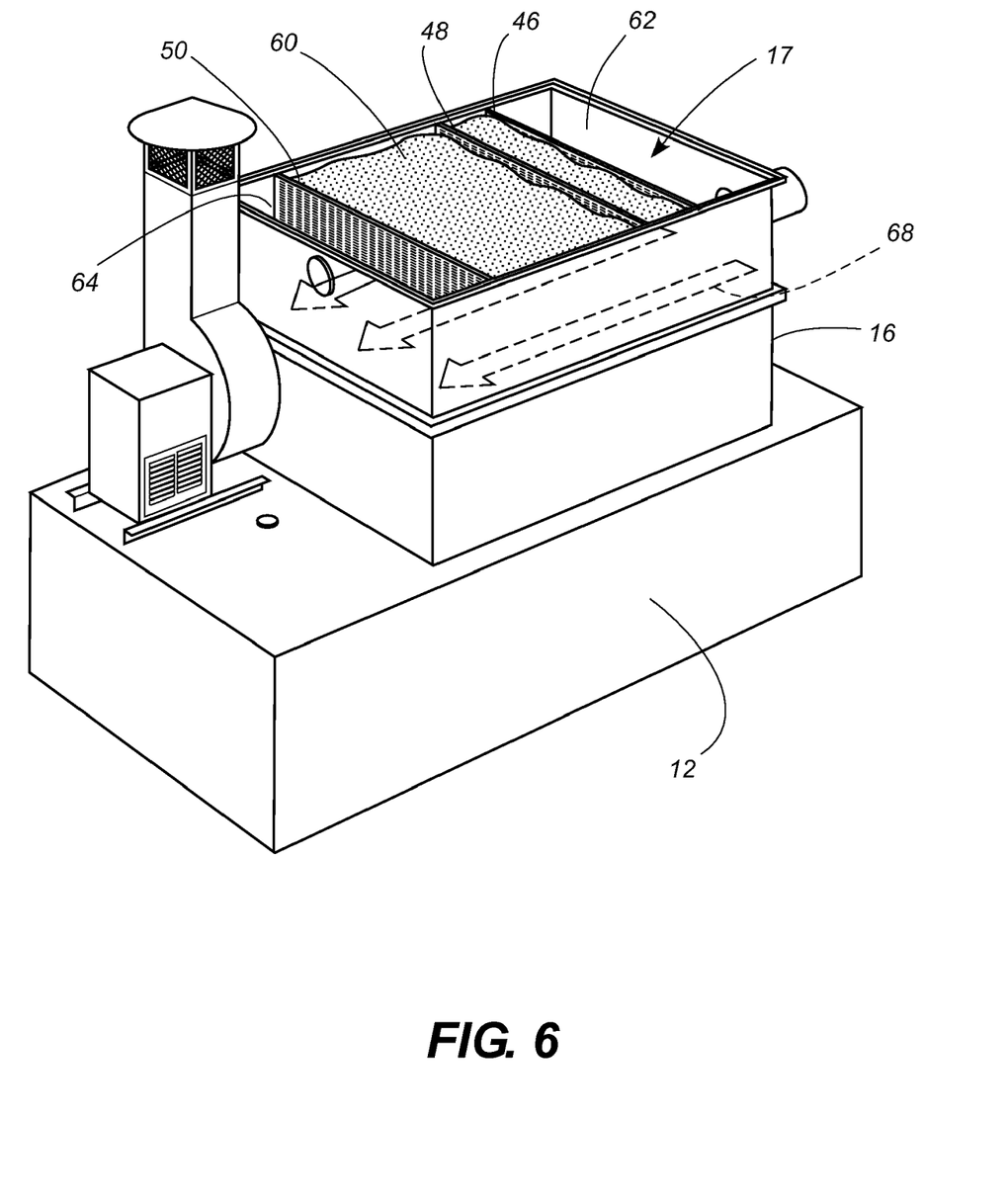
FIG. 6 is a perspective view showing a fifth step in converting the wet scrubber of FIG. 1 into a dry scrubber.

In FIG. 6 dry chemical media 60 is introduced into the spaces between the screens 46, 48, 50. The spaces 62, 64 on either end of the outer screens 46, 50 are left empty to provide plenums to assist in achieving a more even airflow across the cross-section of the reaction chamber. The general direction of the gaseous flow through the reaction chamber is indicated by the dashed arrows 68.

Figure 7:
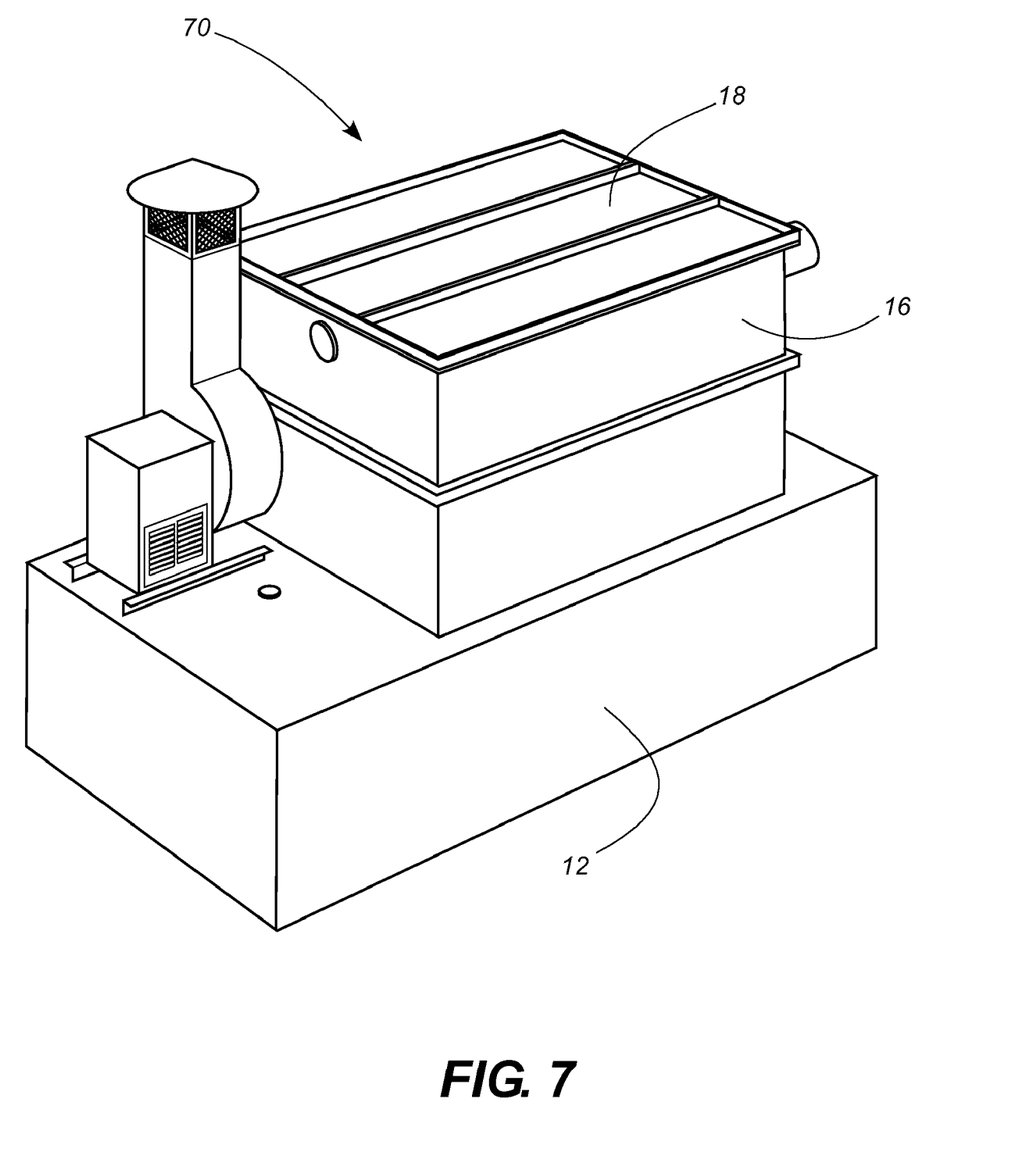
FIG. 7 is a perspective view showing a sixth step in converting the wet scrubber of FIG. 1 into a dry scrubber.

FIG. 7 shows a converted scrubber 70 with the top 18 on the scrubber vessel 16.

Most of the control panel of the scrubber 10 is reusable for the converted scrubber 70. The following control panel components can be reused:

1. Main Disconnect (OFF-ON) switch
2. System Ready (HAND-OFF-AUTO) switch
3. Fan (HAND-OFF-AUTO) switch
4. Green Light: System Ready
5. Red Light: Fan Running
6. Amber Light: Fan Fail
7. Push Button: Alarm Silence
8. Motor Starters for Exhaust Fan
9. Transformer There are several functions of the control panel to deal with pumping the caustic material to the top of the packed bed which are surplus:

1. Circulation Pump (HAND-OFF-AUTO) switch
2. Red Light: Pump Running
3. Amber Lights: Pump Fail & Caustic Low Level
4. Motor Starters for Circulation Pump
5. Time Delay for Exhaust Fan An important feature of the scrubber 70 is the merging of the liquid reservoir 12 and the reaction chamber 17 into one common unit. The merging of the two sections provides sufficient volume for the dry chemical media 60. In the disclosed embodiment, the usable volume available in and below the reaction chamber 17 is 535.5 ft$^3$ (8.5×7×9 ft). This allows for a 6.5×7×9 ft media bed and at least a one foot inlet and discharge plenum. The inlet and outlet connections to the vessel 16 are on opposites sides and help minimize the effects of airflow channeling through the media 60.

As previously stated, if a 1-ton (2,350 lbs) cylinder of chlorine gas were to rupture, approximately 400 lbs of chlorine would flash into vapor. 383 ft$^3$ of dry chemical media weighs approximately 17,250 lbs. For 2,667 lbs of dry chemical media to neutralize 400 lbs. of chlorine gas, the dry chemical media must have a removal capacity of approximately 15% by weight. A suitable dry chemical media having an efficiency of approximately 15% is disclosed in Published U.S. Application No. 2008/0127822 A1 which application is hereby incorporated by reference.

Another factor to be taken in consideration when converting a wet scrubber to a dry scrubber is the heat of reaction in the reaction chamber. A wet scrubber does not generate appreciable heat when neutralizing pollutants in a gas stream. However, when the dry chemical media reacts with the pollutants in the gas stream, the temperature within the reaction chamber increases. In the disclosed embodiment, where the dry media is used to neutralize chlorine gas, the temperature within the reaction chamber 17 increases from ambient (~70° F.) to over 200° F. Because temperature is proportional to gas volume, if the temperature increases, so does the volume of the gaseous flow. Thus the fan 22 has to extract more air from the reaction chamber 17 than actually enters the inlet 20.

The additional volume of gas resulting from the heat of reaction can be approximated from the ideal gas law, $pV=nRT$. If the temperature increases from approximately 70° F. to over 200° F., that increase corresponds to a range of approximately 343° K to over 573° K. Performing the calculations, the volume of the air will increase by a factor of approximately 1.67. As previously indicated, in an application where a wet scrubber is being used to neutralize chlorine gas from a storage chamber, the minimum flow rate entering the scrubber must be at least 2,238 ft$^3$/min. To provide a margin of safety, a wet scrubber typically has a motor and fan combination that will draw 3,000 ft$^3$/min from the reaction chamber. To accommodate the increased gas volume resulting from the temperature increase in a dry scrubber, the fan must be able to draw at least 1.67×3,000 ft$^3$/min., or 5,000 ft$^3$/min. from the reaction chamber. By trial and error, it was decided to exhaust the gas flow in the converted scrubber 70 of the disclosed embodiment at a rate of 6,000 ft$^3$/min.

While the fan in the disclosed embodiment was capable of turning at a sufficient rate to draw 6,000 ft$^3$/min. from the scrubber vessel, it was necessary to increase the size of the motor from a 7½ hp motor to a 20-25 hp motor to achieve the desired flow rate.

Finally, it will be understood that the preferred embodiment has been disclosed by way of example, and that other modifications may occur to those skilled in the art without departing from the scope and spirit of the appended claims.

What is claimed is:

1. An apparatus for removing a pollutant from a gaseous stream, comprising:
    a first vessel defining a first cavity;
    a second vessel adjoining said first vessel and defining a second cavity, said second vessel being of different dimensions from said first vessel, and said first and second cavities being combined to form a common chamber having an upper end and a floor;
    means for drawing a gaseous stream into said chamber at a first location and for drawing said gaseous stream out of said chamber at a second location;
    a plurality of partitions extending substantially from the upper end of said chamber to said floor, said partitions forming spaces therebetween; and
    a dry chemical medium disposed within said spaces between said partitions for neutralizing a pollutant in said gaseous stream;
    wherein said partitions have openings therein of a sufficiently large size to permit said gaseous stream to flow therethrough, and said openings being of a sufficiently small size to prevent said dry chemical medium from passing therethrough.

2. The apparatus of claim 1, wherein said dry chemical medium has a removal capacity of at least approximately 15% by weight.

3. A method for converting a wet scrubber to a dry scrubber, wherein said wet scrubber comprises:
    a tank;
    a scrubber vessel situated on top of the tank, said scrubber vessel defining a reaction chamber;
    a grate dividing the tank from the reaction chamber;
    a fan and fan motor for drawing a gaseous stream into the reaction chamber at a first location and for extracting the gaseous stream from the reaction chamber at a second location;
    dividers within the reaction chamber for defining a circuitous path between the first and second locations to increase the residence time of the gaseous stream within the reaction chamber;

screens disposed within said reaction chamber transverse to said dividers;

packing material disposed within the reaction chamber atop said grate; and a pump and associated plumbing for circulating a caustic material from the tank and spraying it onto the packing material;

said method comprising the steps of:
(a) draining any caustic solution from the tank;
(b) removing the pump and associated plumbing;
(c) removing the packing material, dividers, and screens from the reaction chamber;
(d) removing the grate that divides the tank from the reaction chamber such that the tank and the scrubber vessel define a common chamber;
(e) positioning a plurality of replacement screens within the common chamber, with the lower ends of the screens resting on the floor of the tank, and the upper ends of the screens extending substantially to the upper end of the common chamber; and
(f) introducing a dry chemical media into the spaces between the screens.

4. The method of claim 3, wherein said step of introducing a dry chemical media comprises the step of introducing a dry chemical media having a removal capacity of at least approximately 15% by weight.

5. The method of claim 3, further comprising the step of substituting a fan motor of a larger capacity to compensate for an increase in volume of said gaseous stream resulting from a temperature increase caused by a chemical reaction within the common chamber.

6. The method of claim 5, wherein said larger capacity fan motor is capable of drawing at least two-thirds more air than the original fan motor.

7. The method of claim 3, wherein said step of removing the pump and associated plumbing results in a hole in a wall of said tank, and wherein said method comprises the further step of closing said hole in said tank.

8. The method of claim 3, wherein said step of removing the pump and associated plumbing results in a hole in a wall of said scrubber vessel, and wherein said method comprises the further step of closing said hole in said scrubber vessel.

* * * * *